Figure 1:
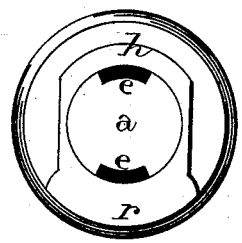
Figure 2:
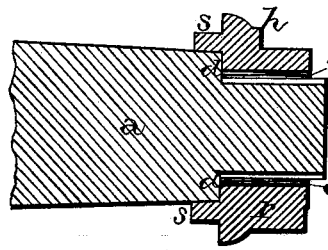
Figure 3:
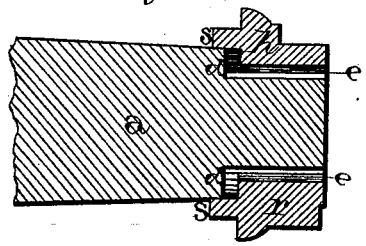
Figure 4:
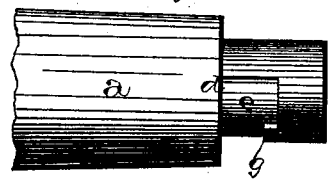
Figure 5:
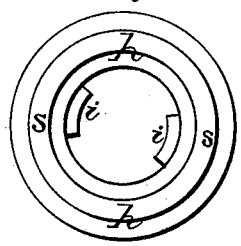

S. KEPNER.
Hub-Attaching Device.

No. 199,914. Patented Feb. 5, 1878.

WITNESSES
J. W. Garner
William S. D. Haines

INVENTOR
S. Kepner,
per
F. A. Schmann,
Atty.

UNITED STATES PATENT OFFICE.

SOLOMON KEPNER, OF POTTSTOWN, PENNSYLVANIA.

IMPROVEMENT IN HUB-ATTACHING DEVICES.

Specification forming part of Letters Patent No. 199,914, dated February 5, 1878; application filed January 7, 1878.

*To all whom it may concern:*

Be it known that I, SOLOMON KEPNER, of Pottstown, in the county of Montgomery and State of Pennsylvania, have invented certain new and useful Improvements in Fastening Hubs to Axles; and I do hereby declare the following to be a full, clear, and exact description of the invention, such as will enable others skilled in the art to which it pertains to make and use it, reference being had to the accompanying drawings, which form part of this specification.

My invention relates to an improvement in fastening hubs to axles; and it consists in the combination of the axle, grooved upon its outer end, and the nut, made preferably heaviest upon one side, and having flanges to catch in the grooves in the end of the axle, as will be more fully described hereinafter.

The accompanying drawings represent my invention.

$a$ represents the spindle, which has its outer end made smaller than any other part, as shown. The sides of this end $c$ are made straight from the shoulder $d$ outward, and upon two opposite sides are cut the two grooves $e$.

These grooves may be of any desired width or depth, extend straight back to the shoulder $d$, then turn at right angles, so as to run in a line with the shoulder, and then run toward the outer end of the spindle.

At the corner where the groove changes from a line with the shoulder to run outward there is formed the projection $g$, behind which the flanges $i$ inside of the nut $h$ catch, to prevent the nut from turning around. The flanges $i$ fit the grooves $e$ as accurately as possible, and are placed in the nut so that when the nut is forced inward upon the end of the spindle the rear ends of the flanges will bear against the shoulder $d$. The nut is then turned around until the flanges strike the end of the groove which runs on a line with the shoulder, when it is drawn outward toward the end of the spindle, until the end of the nut comes flush with the end of the spindle, as shown.

In this position the front ends of the flanges catch behind the projections $g$, and prevent the nut from being turned backward until it has been forced inward far enough to clear the flanges from behind the projections $g$.

As the wheel will keep the nut constantly pressed outward, it will readily be seen that there is no chance for the nut to be forced inward so that it can turn backward.

By the construction above described the screw upon the end of the spindle is entirely dispensed with, harder metal can be used in making the spindle, and hence there will be less friction upon the box, and all danger of the nuts coming off is avoided.

In order to make the nut still more secure, one side of it is made much heavier than the other, as at $r$, and as this weight will be considerable in a full-sized nut, and will always be on the lower side, it will be readily seen that the weight alone will keep it in position. The flange $s$ on the inner side of the nut, against which the wheel wears, will cover the slot in the spindle, which would be exposed when the nut is drawn forward and locked, and thus serves to keep the grease out of the slot.

Having thus described my invention, I claim—

1. The combination of the spindle $a$, having the rectangular grooves $e$ made in its outer end, and provided with the projection $g$, with the nut $h$, having the flanges $i$, substantially as shown and described.

2. The combination of the nut $h$, made heaviest upon one side, as at $r$, having the flange $s$ on its inner edge, and the flanges $i$, with the axle $a$, having the grooves $e$ and shoulder $g$, substantially as set forth.

In testimony that I claim the foregoing I have hereunto set my hand this 3d day of January, 1878.

SOLOMON KEPNER.

Witnesses:
 O. J. KULP,
 E. H. SCHAEFFLE.